Patented Nov. 16, 1948

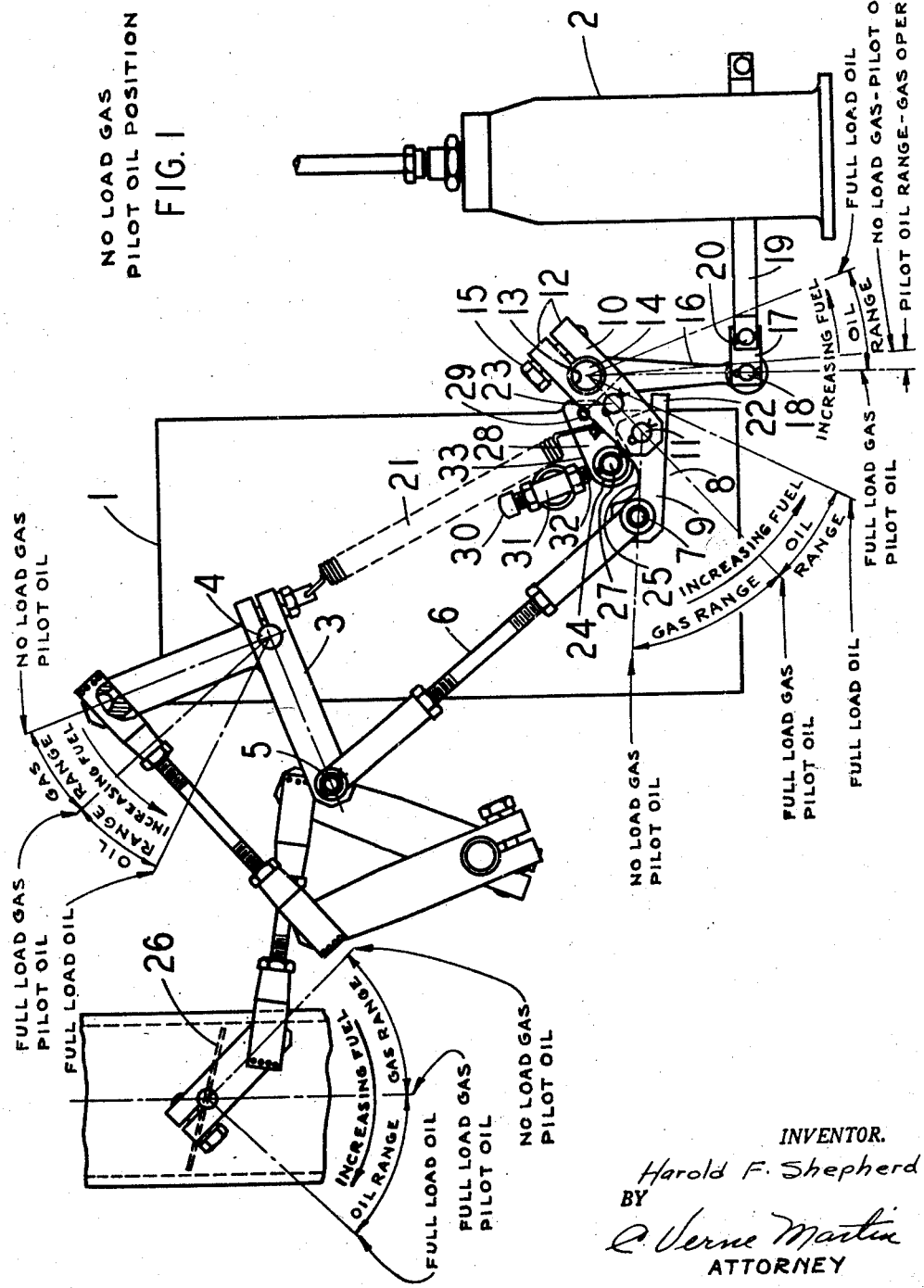

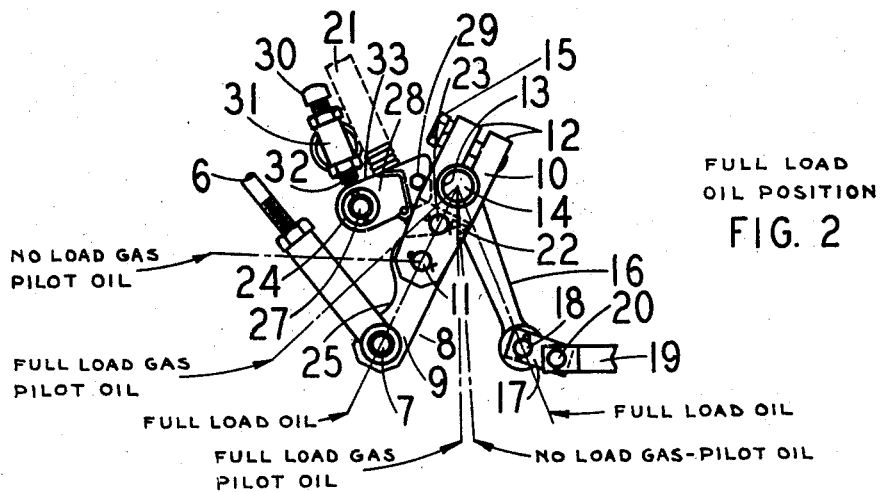
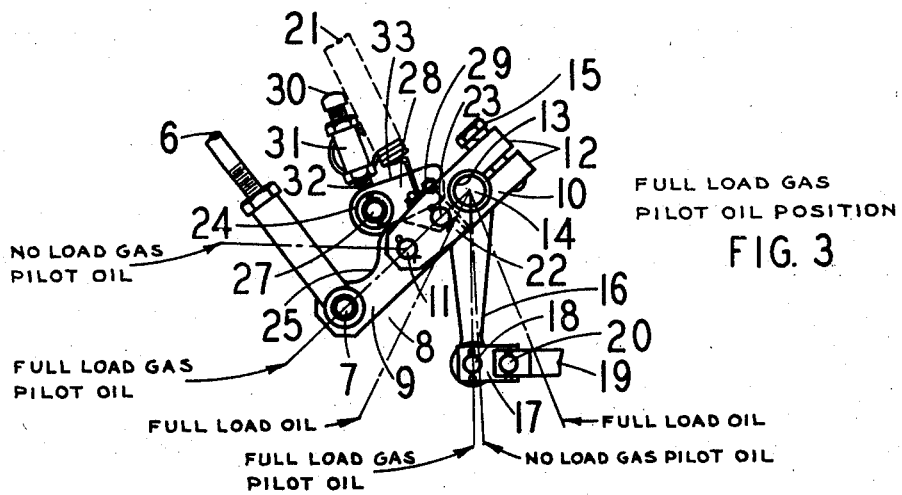

2,454,222

UNITED STATES PATENT OFFICE 2,454,222

FUEL REGULATING MEANS FOR DUAL FUEL ENGINES

Harold F. Shepherd, Springfield, Ohio, assignor to The National Supply Company, Pittsburgh, Pa., a corporation of Pennsylvania Application October 18, 1947, Serial No. 780,742

6 Claims. (Cl. 123—121)

1

This invention relates to an automatic means for regulating a secondary combustible introduced into the cylinders of a compression-ignition engine adapted to the burning of two different fuels, such as a gas and a liquid, simultaneously while operating under varying load conditions, and is related to the subject matter disclosed in the pending application, Serial No. 645,143, filed February 2, 1946, by Albert B. Reese, Jr., covering "Governor control mechanism for dual-fuel engines" and is further related to the application of Harvey W. Hanners et al., covering an "Acceleration element for fuel controlling means for internal combustion engines," filed simultaneously with the instant invention on October 18, 1947, and bearing Serial Number 780,656, and assigned to the common assignee of all three applications; namely, The National Supply Company.

Exhaustive tests have proven that the quantity of secondary fuel (such as fuel oil used as a pilot medium for ignition purposes) required for economical operation of a dual-fuel engine operating on gas as the primary fuel should vary inversely with the load. (It is to be understood that the designation "pilot oil" where used in this specification and claims refers to the small quantity of fuel oil used as an ignition medium for the gaseous fuel.) In other words, when the engine is operating on gas, as the primary fuel, at full load or substantial fractional loads the secondary fuel or pilot oil may be reduced to as little as five percent of the maximum charge, but when operating under light load with a gaseous fuel the combustion may be slow and irregular unless the quantity of secondary fuel is considerably increased. The Reese application mentioned above discloses one mechanism for accomplishing this result. Further development has resulted in the simplified mechanism which lends itself to more economic production for accomplishing this desired result, which is the subject matter of the present application.

It is, therefore, the principal object of my invention to provide a mechanism capable of automatically regulating the amount of secondary fuel or pilot oil fuel introduced into the cylinder of a compression-ignition type engine, adapted to the burning of two different fuels simultaneously, while operating under varying load conditions, which will supply more secondary fuel oil into the engine cylinder at no load than at full or substantial fractional load operation.

Another object of my invention is to provide a low cost simplified mechanism for use with an internal combustion engine operating on dual fuels, which will automatically regulate the quantity of secondary fuel or pilot oil required to maintain smooth engine performance at light load or idling conditions while operating on a gas as a primary fuel.

Another object of my invention is to provide a mechanism for use with a compression-ignition type engine operating on dual fuels under varying load conditions which will automatically regulate the supply of fuels such that when the gas or primary fuel supply decreases, sufficient oil or secondary fuel will be supplied to the engine to maintain smooth engine performance at the required speed and load demands.

A specific object of my invention is to provide a linkage system actuated by an engine driven governor for use with a compression-ignition type engine adapted to the burning of two different fuels simultaneously, while operating under varying load conditions, which will automatically regulate the supply of fuels such that when the gas or primary fuel supply decreases or becomes insufficient to maintain speed and load demands, the supply of oil or secondary fuel delivered to the combustion chamber will be increased to overcome such deficiency.

Further objects and advantages of my invention will become apparent and in part specifically referred to in the description and specification to follow, which taken in conjunction with the accompanying drawings discloses the preferred form of apparatus in accordance with my invention. It should be understood, however, that the disclosure is illustrative of the principles of my invention in its broader aspects.

Figure 1 is a diagrammatic arrangement of a linkage system comprising my invention in assembled working relationship with a fuel pump and a gas valve positioned for idling or operation at no load of gas fuel using sufficient pilot oil to maintain satisfactory smooth engine performance.

Figure 2 is a diagrammatic arrangement of the linkage disclosed in Figure 1 and is shown in full load using oil as the only operating fuel.

Figure 3 is a diagrammatic arrangement of the linkage disclosed in Figure 1 and is shown in full load operating on gas as the operating fuel and pilot oil only being used as the igniting medium for the gaseous fuel.

In the drawings the numeral 1 represents a governor to be driven by and mounted upon an internal combustion engine (not shown). It is so designed as to have a range of movement equal to twice that required to control the engine on either gas or oil fuel.

The first half of the governor range controls only the oil delivered by the fuel pump 2 through a system of links, levers and their accompanying connections as follows: the actuating arm 3 is rigidly secured at one end of the governor shaft 4 and moves in an arcuate path with respect to the shaft center as the governor shaft 4 is caused to rotatably move in response to engine demands for more or less fuel. The opposite end of the actuating arm 3 is pivotally attached as by pin 5 to an adjustable connecting link 6, which in turn is pivotally attached as by pin 7 to a two-piece articulated control lever assembly 8, comprising a floating link 9 and a control arm 10, hinged together by the pin 11. The end of the arm 10 remote from the hinge pin 11 is bifurcated as at 12 and is provided with a bore 13 in communication with the bifurcated end 12. This portion of arm 10 is rigidly secured to the fuel pump control shaft 14 by the clamping bolt 15, threadably engaging the bifurcated end 12 and securely clamping the arm 10 to the shaft 14. The fuel pump control lever 16 is secured at its upper end to shaft 14 and is pivotally connected at its lower end to a link 17 by pin 18. The fuel pump rack 19 is pivotally fastened at one end to the link 17 by means of pin 20 while the opposite end operatively engages the fuel pump 2.

During this part of the governor control range the articulated lever assembly 8 is in effect a rigid or solid lever, the spring 21 holding the spur 22 of the floating link 9 against the pin 23 as fully disclosed in Figures 2 and 3.

The other half of the governor range controls the gas fuel as well as the pilot oil required for successful performance when operating on dual-fuel either at full load conditions or at any other speed and load demand down to and including the no load or idling requirements.

In transferring from oil fuel to gas fuel it is only natural that the speed increases somewhat since temporarily there are two sources of fuel. In general the governor shaft 4 rotates in a clockwise direction to reduce the fuel supplied to the engine. This movement causes the actuating arm 3 and adjustable connecting link 6 to rotate the articulated lever assembly 8 in a clockwise direction towards a stop 24. When the surface 25 on the floating link 9 of the articulated lever assembly 8 contacts the stop 24, further motion of the fuel pump control lever 16 in the direction to reduce the supply of oil fuel to the engine ceases.

Further motion of the governor shaft 4, through which the gas controlling means 26 is actuated by means of conventional links, shafts and arms to accommodate the load demand, results in jack-knifing of the articulated lever 8 about the stop 24 as a fulcrum, as clearly shown in Figure 1. The contacting surface 25 of the member 9 is not concentric with the pin 11, but is in effect a cam so contoured as to cause a counterclockwise movement of the member 10 in the direction of increasing the quantity of oil fuel to the engine as the gas supply is decreased by the action of the governor.

The stop 24 is in the form of a roller mounted to freely revolve about a pin 27 secured to a bracket 28, which in turn is adjustably mounted upon the body of the governor 1 by suitable means, such as by cap screw 29. The position of the stop 24 relative to the surface 25 of the floating lever 9 may be made adjustable by means of a set screw 30 threadably engaging a bracket 31 mounted on the body of the governor 1, the point 32 of the set screw bearing against the surface 33 of the bracket 23 to change its position and consequently that of the roller stop 24. By providing adjustability for the stop it is possible to obtain the desired quantity of ignition oil at any load.

The contour of the cam surface of member 9 determines the variation in the quantity of ignition oil from full load on gas fuel to no load or friction load at idling speed.

While my invention has been disclosed as carried out by apparatus of the above described specific construction, it should be understood that many changes may be made therein without departing from the spirit of the invention in its broader aspects and I do not wish to be limited or restricted to the specific details set forth but wish to reserve to myself any further embodiments, modifications and variations that may appear to those skilled in the art or fall within the scope of the appended claims.

Having fully disclosed my invention, what I claim as new and desire to secure by United States Letters Patent is:

1. An internal combustion engine operating on fuel oil or gaseous fuel fired by pilot oil and provided with an engine driven governor for regulating the combined fuel supplied to said engine through a governor control linkage system including a stop and means incorporated in said linkage system comprising an articulated lever adapted to operate as a solid lever to control the supply of pilot oil under normal operation and adapted to operate as a cam fulcruming about said stop to supply additional oil fuel when the gas supply is decreased.

2. An internal combustion engine adapted to the burning of a gaseous fuel fired by pilot oil and provided with an engine driven governor to regulate both the oil and gaseous fuel from their source of supply to said engine in response to load demands through a governor control linkage system including a stop and an articulated control lever, said lever operating as a solid lever to control the supply of pilot oil for normal engine operation and adapted to automatically operate as a lever actuated cam fulcruming about said stop to supply more oil fuel to said engine for fractional loading or idling operation on gaseous fuel.

3. A compression-ignition engine adapted for the burning of a primary and a secondary fuel simultaneously and provided with a common speed controlling and fuel regulating means driven by said engine to control the fuels from their respective source of supply to said engine in response to load demands through a linkage actuated by said means and including a stop, a fuel pump control shaft for the secondary fuel, an articulated control lever assembly incorporated in said linkage and comprising a floating link and an arm adapted to arcuately move said control shaft, said lever assembly formed to operate as a solid lever until interrupted by said stop, after which said floating link operates as a lever actuated cam in such manner as to cause a reversal of direction of motion of said arm and said fuel pump control shaft to cause more secondary fuel to be introduced at no load or fractional load than at full load operation.

4. A compression-ignition engine adapted for the burning of a primary and a secondary fuel simultaneously and provided with a common speed controlling and fuel regulating means driven by said engine to control the fuels from their respective source of supply to said engine in response to load demands through a linkage actuated by said means and including an adjustable stop, a fuel pump control shaft for the secondary fuel, an articulated control lever assembly incorporated in said linkage and comprising a floating link and an arm adapted to arcuately move said control shaft, said lever assembly formed to operate as a solid lever until interrupted by said stop, after which said floating link operates as a lever actuated cam in such manner as to cause a reversal of direction of motion of said arm and said fuel pump control shaft to cause more secondary fuel to be introduced at no load or fractional load than at full load operation.

5. An internal combustion engine operating on fuel oil or gaseous fuel fired by pilot oil and provided with an engine driven governor for regulating the combined fuel supplied to said engine through a governor control linkage system including an adjustable stop and means incorporated in said linkage system comprising a two part lever adapted to control the supply of pilot oil under normal operation and adapted to operate as a cam fulcruming about said stop to supply additional oil fuel when the gas supply is decreased.

6. A dual fuel engine of the internal combustion type operating on fuel oil or gaseous fuel fired by pilot oil and provided with an engine driven governor for regulating the combined fuel supplied to said engine through a governor control linkage system including a stop, a fuel pump control shaft for the oil fuel, a lever assembly comprising a floating link and a control arm secured to said control shaft and adapted for arcuate travel toward and away from said stop, said lever assembly operating to control the supply of pilot oil under normal operation until interrupted by said stop, after which said floating link operates as a lever actuated cam to cause a reversal of direction of motion of said arm and said control shaft to introduce more oil fuel at no load or fractional load than at full load operation.

HAROLD F. SHEPHERD.

REFERENCES CITED

The following references are of record in the file of this patent:

UNITED STATES PATENTS

| Number | Name | Date |
| --- | --- | --- |
| 2,400,219 | Barnaby et al. | May 14, 1946 |
| 2,400,247 | Miller et al. | May 14, 1946 |